No. 103,785.
G. SEWELL.
HOSE COUPLING.
PATENTED MAY 31, 1870.
3 SHEETS—SHEET 1.
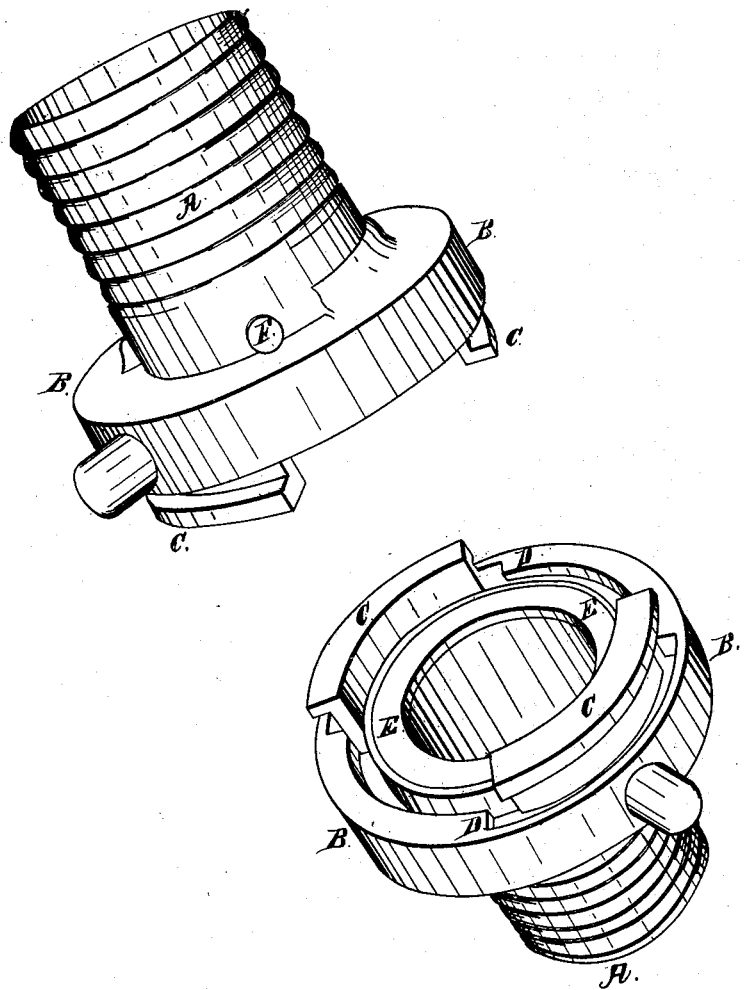
Witnesses:
Henry A. W. Ford.
Henry H. Prentiss.
Inventor:
Geo. Sewell.

No. 103,785.  
PATENTED MAY 31, 1870.  
G. SEWELL.  
HOSE COUPLING.  
3 SHEETS—SHEET 2.
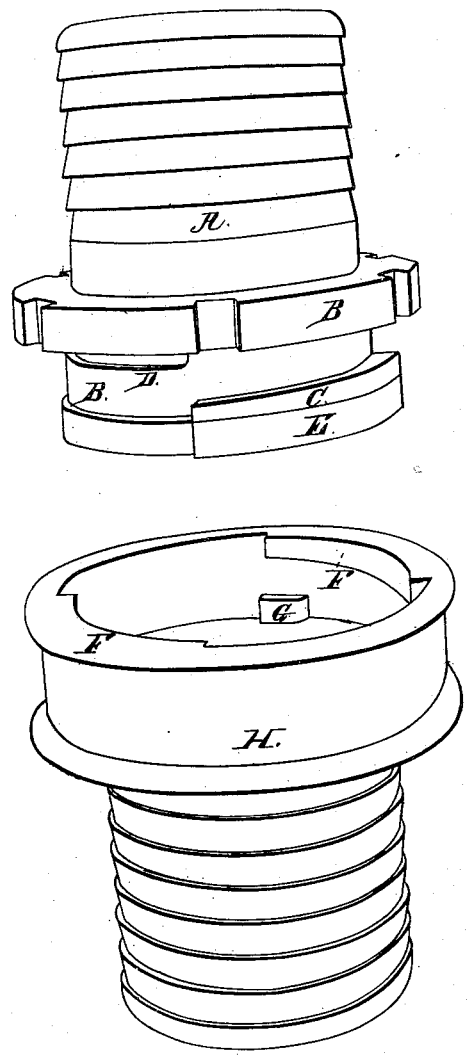

No. 103,785.                                              PATENTED MAY 31, 1870.
G. SEWELL.
HOSE COUPLING.
3 SHEETS—SHEET 3.
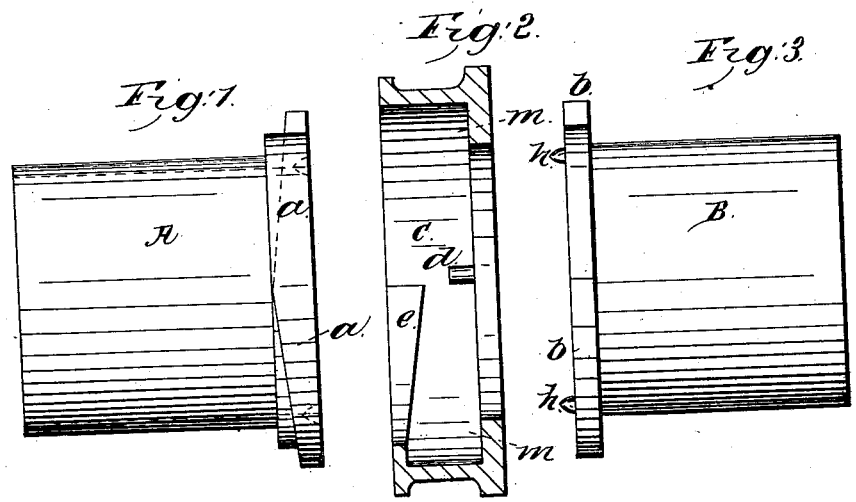
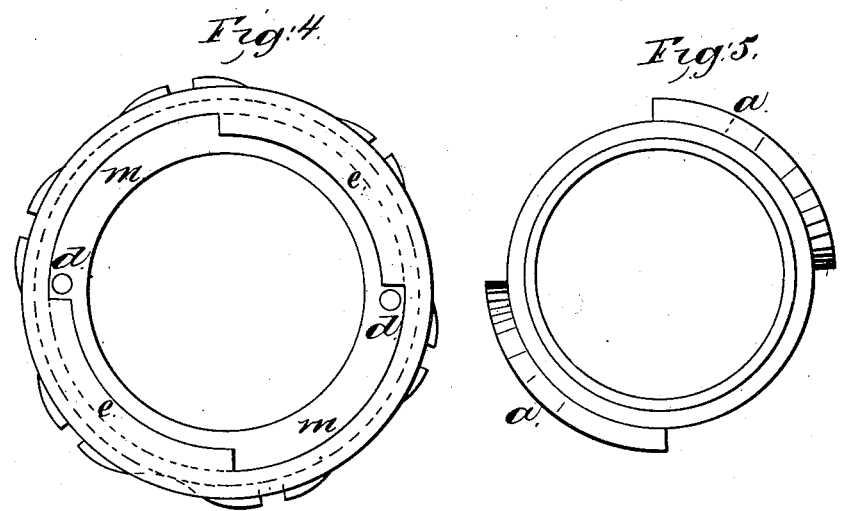
Witnesses:
Henry A. W. Ford.
Henry H. Prentiss
Inventor:
Geo. Sewell.

United States Patent Office.

GEORGE SEWELL, OF BROOKLYN, NEW YORK.

Letters Patent No. 103,785, dated May 31, 1870.

IMPROVEMENT IN HOSE-COUPLINGS.

The Schedule referred to in these Letters Patent and making part of the same.

To all whom it may concern:

Be it known that I, GEORGE SEWELL, of Brooklyn, in the county of Kings and State of New York, have made a new and useful Improvement in Hose-Couplings; and I hereby declare the following to be a full and exact description of the same, reference being had to the accompanying drawing forming part of this specification.

My invention consists in certain improvements and modifications of the hose-coupling described in my patent of February 8th, 1870, No. 99,715.

The first modification and improvement is shown in Sheet I of drawing, in which—

A A are the parts to which the hose is attached.

B B, the collars for locking the parts together in coupling.

C C C C are segmental cam flanges, each being a quadrant, or the fourth part of a circumference. In this form of coupling the parts are simply reversed from that shown in patent No. 99,715. Instead of segmental lugs connected with the parts A A, there are segmental cam-flanges; and instead of segmental cam-flanges on the collar, there are segmental grooves, so as to lock with the flanges on the parts A A.

The two parts which form this coupling are exact duplicates the one of the other. The following is the mode of joining the couplings:

The collar B is turned a quarter round from the position shown in the lower figure in Sheet I, so that the collar-flange D is brought along side of the flange C.

The two parts of the coupling may then be brought together, the flanges C of the one part entering between the ends of the flanges D of the other part. Then, by turning the collars in opposite directions, the flange D of the collars will pass under the flange C. As the flanges are in the form of inclined planes they wedge together and mesh each part closely against the other, so as to form a water-tight-joint.

The packing-ring E will assist in closing the joint.

The coupling formed in this manner is very simple and durable. The flanges and grooves are all covered up and protected by the collars B B, so that the hose with this coupling may be roughly handled without danger of breakage or injury.

Another modification of my invention is shown in Sheet II of the drawing. In this form the parts are not exact duplicates of each other, but are counter-parts, that is, male and female. The upper figure in Sheet II shows the male or piston, and the lower figure the female or socket portion. The male part A carries the locking-collar B, which is constructed the same as in patent No. 99,715, with segmental cam-flanges or inclined planes C.

The collar B is held to the part A by a stud which moves in a slot, D, which permits the collar to turn through a quadrant.

On the socket portion are also segmental flanges F in the form of inclined planes, and on the male or piston portion are corresponding plane-flanges E. The collar B has on its lower edge two segmental flanges C in the form of inclined planes.

The following is the mode of connecting this form of coupling:

The collar is placed as shown in the upper figure in Sheet II, so that the flanges C and E coincide. The parts may then be brought together, the flanges C and E going between the flanges F F, until the end of the flange C rests against the stop G, which is fastened in the bottom of the socket. Then, by turning the collar, the flanges C on the collar are brought under the flanges F on the socket, and, being in the form of inclined planes, draw the parts closely together and lock them. The stops G prevent the parts turning on each other, and so prevent the coupling from unlocking till the collar is turned.

The third modification and improvement is shown in Sheet III of the drawing, in which—

Figure 1 is a perspective view of one part of the coupling;

Figure 2 is a sectional elevation of the sleeve or binding-ring;

Figure 3, a perspective view of the other part of the coupling;

Figure 4 is a plan view of the part shown in fig. 2; and

Figure 5, a plan view of the part shown in fig. 1.

In this form of my invention the parts are not duplicates of each other, but are substantially the reverse of the form shown in Sheet II. In Sheet II the collar is permanently attached to one-half of the coupling, so as to form the socket, and the locking device enters it, and turns inside of it, so as to lock the inclined planes together. In the form shown in Sheet III, the collar turns over the flanges similar to the form shown in Sheet I.

The following are the parts shown in Sheet III of the drawing:

A and B are the parts to which the ends of the hose are attached. On A are segmental flanges $a\ a$ in the form of wedges or inclined planes, each being a quadrant, (see fig. 5.) On the part B are corresponding segmental flanges $b$, which are not wedge-shaped. The collar C has on its inside two segmental flanges $c$, which are in the form of inclined planes, and on the opposite edge a continuous flange, $m\ m$, with two stop-pins $d\ d$. The collar C is passed over the portion B, so that the flanges $b\ b$ rest in the bottom of the collar on the flange $m$, the ends of the flanges $b\ b$ resting against the stops $d\ d$. When the collar is placed on the part B it will resemble the socket portion of the coupling shown in Sheet II, with this difference, however, that the collar C revolves through a quarter of a circle on the part B, and does not revolve in the form shown in Sheet II.

The following is the mode of using this form of my invention:

The parts are united by bringing the part A in such a position that the flanges $a\ a$ enter between the flanges $e\ e$. On the part B are projections $h\ h$, which enter small sockets in the face of the flanges $a\ a$, so that, when brought together, the parts A and B cannot turn on each other. Then, by turning the collar C, the flanges $e\ e$ are brought over the flanges $a$ and $b$, and lock them together, each pair of flanges $a\ b$ being pressed between the flange $e$ and the bottom flange $m$ of the collar.

In all the forms of my coupling there are certain common features. In that described in my patent of February 8th, 1870, the two parts which are attached to the hose are divided on the outer edge into four segments, each alternate one of which being removed so that the parts interlace the one with the other. The same construction as to the four divisions is adhered to in all the forms. The parts, when brought together, are then locked by means of a collar with flanges in the form of inclined planes, which engage with corresponding flanges on the two parts of the coupling. In two of the forms, viz, in that described in patent No. 99,715, and in that shown on Sheet I of the drawing which forms part of this specification, there are duplicate locking-collars with flanges, but either collar alone will answer. In the first the flanges on the pieces connected with the hose project inwardly, and those on the collar project outwardly. In the form shown on Sheet I, the relative position is reversed, that is, the flanges on the pieces connected with the hose project outwardly, and those on the collars project inwardly. A corresponding change of the relative position of the flanges makes the principal difference between the forms shown in Sheets II and III.

In all the forms I have shown only four segments, but the same mode of coupling could be carried out by making six, eight, or other even number of equal divisions, each alternate one being removed.

Having thus described my invention,

What I claim, and desire to secure by Letters Patent of the United States, is—

1. A hose-coupling, formed by means of a tubular portion with segmental flanges, in combination with a locking-ring, with corresponding flanges in the form of inclined planes, substantially as described.

2. The parts A A, with segmental flanges C C, in combination with the collars B B, having corresponding flanges D D, substantially as described.

GEO. SEWELL.

Witnesses:
HENRY A. W. FORD,
JOHN A. WALLACE.